US009042437B2

(12) United States Patent  
Boccaccio et al.

(10) Patent No.: US 9,042,437 B2  
(45) Date of Patent: *May 26, 2015

(54) PROGRAMMABLE HDMI CABLE AND METHOD INCLUDING EXTERNAL PROGRAMMER

(71) Applicant: Metra Electronics Corporation, Holly Hill, FL (US)

(72) Inventors: Jeffrey A Boccaccio, Palm Coast, FL (US); Jessy J Crabb, Ormond Beach, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,804

(22) Filed: Aug. 30, 2013

(65) Prior Publication Data

US 2014/0119425 A1  May 1, 2014

Related U.S. Application Data

(63) Continuation-in-part of application No. 13/662,980, filed on Oct. 29, 2012, now Pat. No. 8,964,861.

(51) Int. Cl.
| | |
|---|---|
| *H04B 3/00* | (2006.01) |
| *H04L 25/00* | (2006.01) |
| *G09G 5/00* | (2006.01) |
| *H04L 25/03* | (2006.01) |

(52) U.S. Cl.
CPC .......... *G09G 5/006* (2013.01); *H04L 25/03885* (2013.01)

(58) Field of Classification Search
CPC ................ H04L 1/205; H04L 25/0272; H04L 25/03885; H04L 25/08; G09G 5/006
USPC .......................... 357/257, 259, 260; 375/232
See application file for complete search history.

(56) References Cited

U.S. PATENT DOCUMENTS

| | | | |
|---|---|---|---|
| 2002/0186048 A1* | 12/2002 | Tang et al. | 326/86 |
| 2009/0206962 A1* | 8/2009 | Chou et al. | 333/28 R |
| 2010/0020179 A1* | 1/2010 | Horan et al. | 348/181 |
| 2011/0150487 A1* | 6/2011 | Walter | 398/115 |
| 2012/0137026 A1* | 5/2012 | Shen et al. | 710/19 |
| 2013/0006469 A1* | 1/2013 | Green et al. | 701/36 |

* cited by examiner

*Primary Examiner* — David B. Lugo  
(74) *Attorney, Agent, or Firm* — J. Wiley Horton (57) ABSTRACT

A method for optimizing the performance of an active HDMI cable. An active cable compensator is provided within the HDMI cable itself. The parameters controlling each of the active components (such as parameters setting gain and frequency distribution) within an individual HDMI cable are set through a programming process. The programming is preferably performed with the cable installed between the actual source and actual sink it will be connecting. The HDMI cable includes an internal controller that governs the equalizers and other active functions. A memory is connected to this controller so that settings may be retained even when power is lost.

20 Claims, 10 Drawing Sheets

PROGRAMMABLE HDMI CABLE AND METHOD INCLUDING EXTERNAL PROGRAMMER

CROSS-REFERENCES TO RELATED APPLICATIONS

This non-provisional patent application is a continuation-in-part of U.S. application Ser. No. 13/662,980. The parent application was filed on Oct. 29, 2012. It listed the same inventors as the present invention and remains pending as of the filing of this application.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of communications. More specifically, the invention comprises a method for providing an active HDMI cable and programming that cable to optimize its performance as installed.

2. Description of the Related Art

The present invention operates within the context of prior art HDMI cable technology. Although this technology is well known to those skilled in the art, a brief explanation of its features may aid the reader's understanding of the invention. "HDMI" stands for "High-Definition Multimedia Interface." HDMI cable is commonly used to carry high-definition video and audio data between television-related components. For example, HDMI cables are often used to connect satellite "set top boxes" to associated video displays and surround-sound systems. However, HDMI cables carry more than just video and audio information. While there is some variability within the defined HDMI standards, most HDMI cables carry: (1) high-definition digital video data, (2) digital audio data, (3) CEC (consumer electronics connection) command data, (4) Ethernet data, (5) digital content encryption data, and (5) component "handshake" data.

Some of the information is unidirectional—meaning that it travels only from the source to the sink. Digital video data is an example of unidirectional information. Some of the information is bidirectional—meaning that it travels from the source to the sink and from the sink to the source. Component handshake data is an example of bidirectional information.

Figure 1:
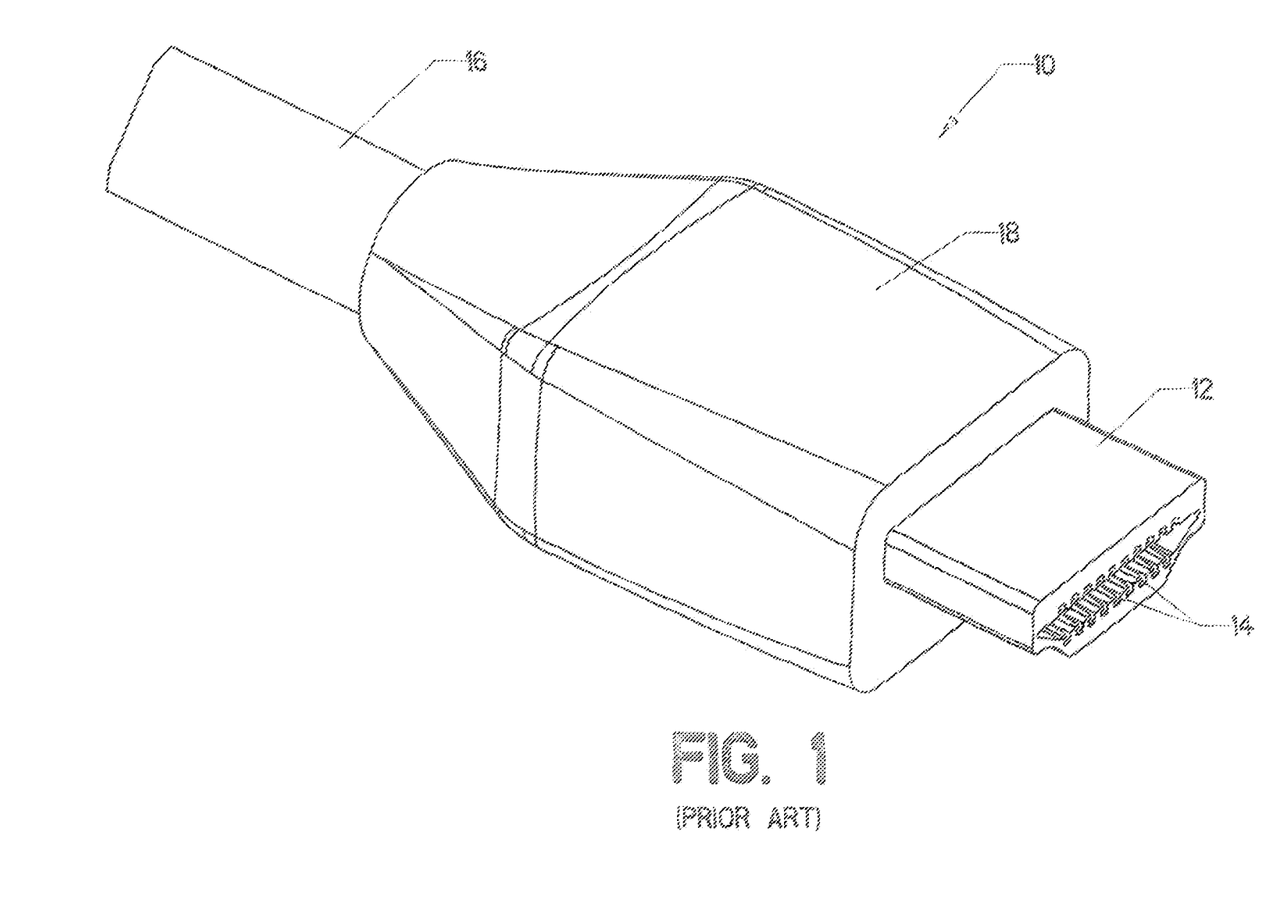
FIG. 1 is a perspective view, showing a portion of a prior art HDMI cable.

The beauty of the HDMI standard is that all these connections are made via a single integrated cable. FIG. 1 shows a representative prior art HDMI cable 10. An HDMI cable typically includes an integrated conductor bundle 16 having a termination 18 on each end. The conductor bundle includes multiple isolated conductors within a single protective jacket. Termination 18 provides a transition for the conductor bundle to connector 12.

Connector 12 opens into a cavity including numerous pins 14. The pins actually make the electrical connection when the connector is plugged into an HDMI receptacle. Connector 12 is referred to as a "male" connector in the traditional nomenclature of electrical connections. However, the reader will note that the connector actually includes a cavity that receives a protruding part on a corresponding HDMI receptacle. The pins 14 are biased inward. They maintain a clamping force when connector 12 is plugged into an HDMI receptacle, thereby making contact with the electrical "lands" provided on the receptacle.

Figure 2:
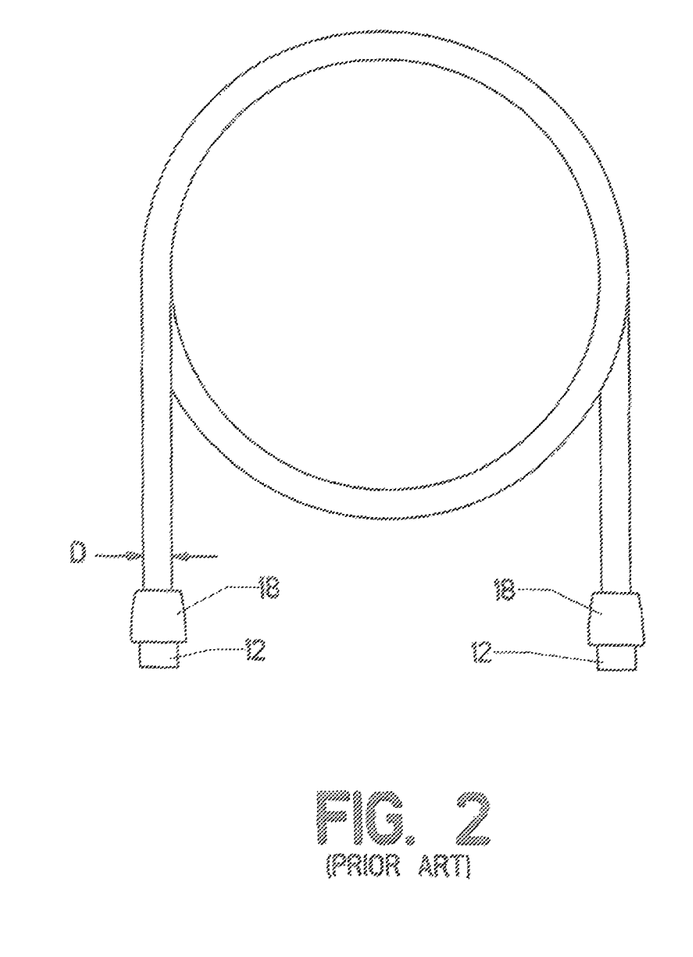
FIG. 2 is a plan view, showing a prior art HDMI cable.

FIG. 2 shows a complete prior art HDMI cable 12 in a coiled state. Conductor bundle 16 includes a termination 18 on either end. The termination provides a transition between the parallel or twisted conductors in the conductor bundle and the connector 12. Each conductor within the bundle is electrically connected to a pin within the connector. Termination 18 is commonly molded over the completed connections between the conductors and the pins within the connector (a process known as "overmolding"). The termination is relatively rigid, in order to provide strain relief for the connections between the conductors and the pins.

Conductor bundle 16 is preferably flexible, so that the cable may be bent and routed as desired. The flexibility of prior art HDMI cables is limited by the diameter "D" and the materials selected. HDMI cables are known to have a fairly large diameter in comparison to the cable's length. For example, HDMI cables having a length of 1 to 3 meters typically have a diameter of 7 mm (0.275 inches). This relatively large diameter makes conductor bundle 16 fairly stiff, which can interfere with the routing of the cable around corners.

Figure 3:
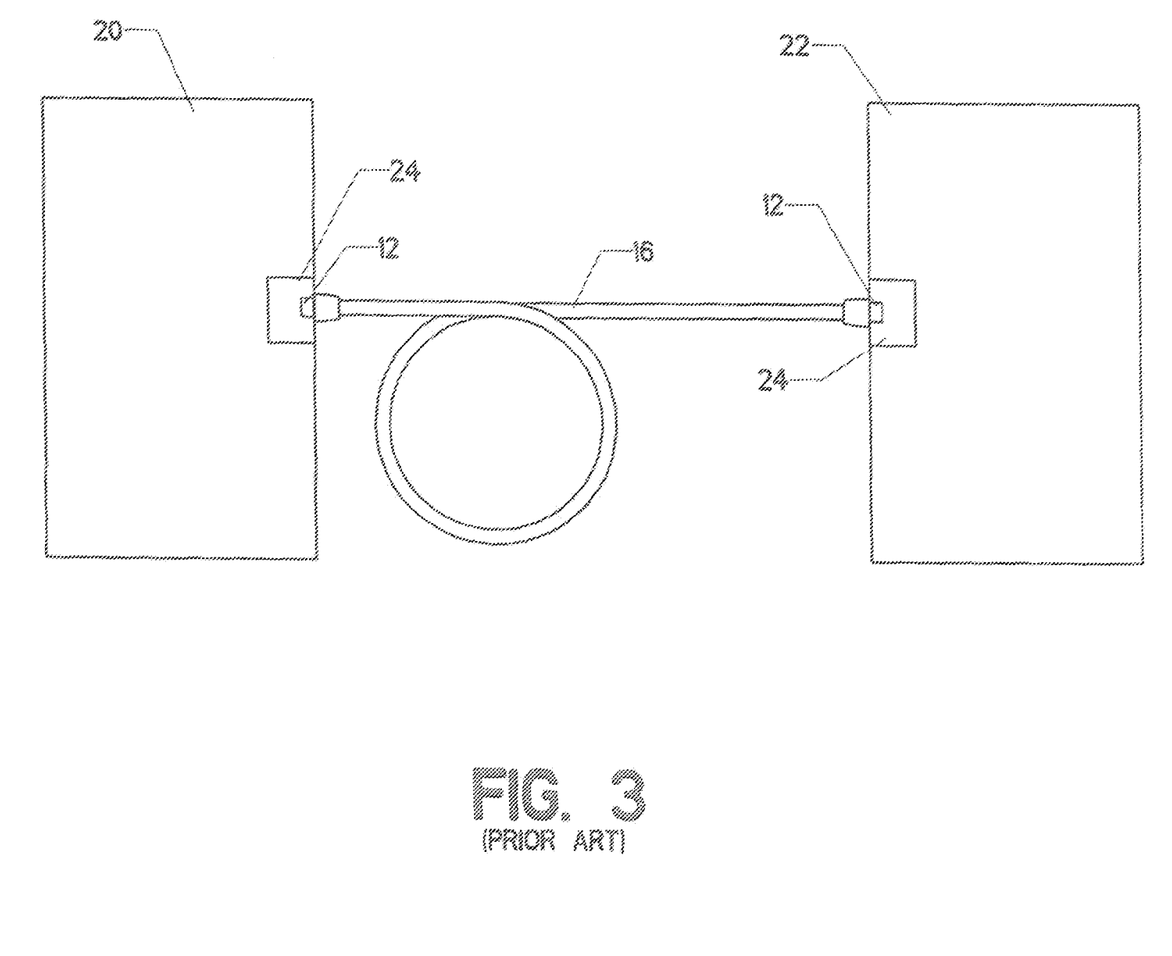
FIG. 3 is a plan view, showing a prior art HDMI cable connecting a source to a sink.

FIG. 3 shows an HDMI cable connecting source 20 to display device 22. A "source" can be any type of device that transmits data for use by an HDMI cable. Examples include satellite or cable set top boxes, DVD players, audio processing units, video recorders, etc. The term "display device" refers in this example to a video display that may or may not include audio capability as well. A good example is a high-definition television. The reader should bear in mind that a "display device" is only one type of device that might use an HDMI cable. One might more generally refer to the device in the position of display device 22 as a "sink." The term "sink" might include a surround-sound unit, a digital video recorder, or a computer. The reader should bear in mind throughout this disclosure that whenever the term "display device" is used one could substitute some other type of "sink" device.

Both source 20 and display device 22 are equipped with an HDMI receptacle 24. The connector on each end of the HDMI cable is plugged into an HDMI receptacle. Thus, the HDMI cable connects the source to the display device. Since the HDMI cable provides video data, audio data, and auxiliary conduits facilitating digital communication between the devices, it is often the only connection needed. This "one wire" approach is often touted as HDMI's main benefit.

However, existing HDMI cables have some drawbacks. First, the HDMI standard specifies a minimum mechanical extraction force of only 9.8N (2.2 pounds) for the HDMI connectors. This fact means that an HDMI connector is relatively easy to pull free of its socket. The available retention force would be sufficient if the HDMI connectors were attached to a thin and flexible cable. This is not typically the case, however. As mentioned previously, the conductor bundle portion of an HDMI cable is often relatively thick and rigid. When the cable is bent and flexed between components the cable bundle itself creates extraction forces on the connectors. These forces may actually pull the connector free of the receptacle. Even if the connector is not pulled free, the forces placed on the connector may cause some of the individual pins within the connector to become disconnected.

The common thickness and rigidity of HDMI conductor bundles is driven by the existing HDMI technology, and it is important for the reader to understand the limitations of this technology before the present invention is discussed.

Figure 4:
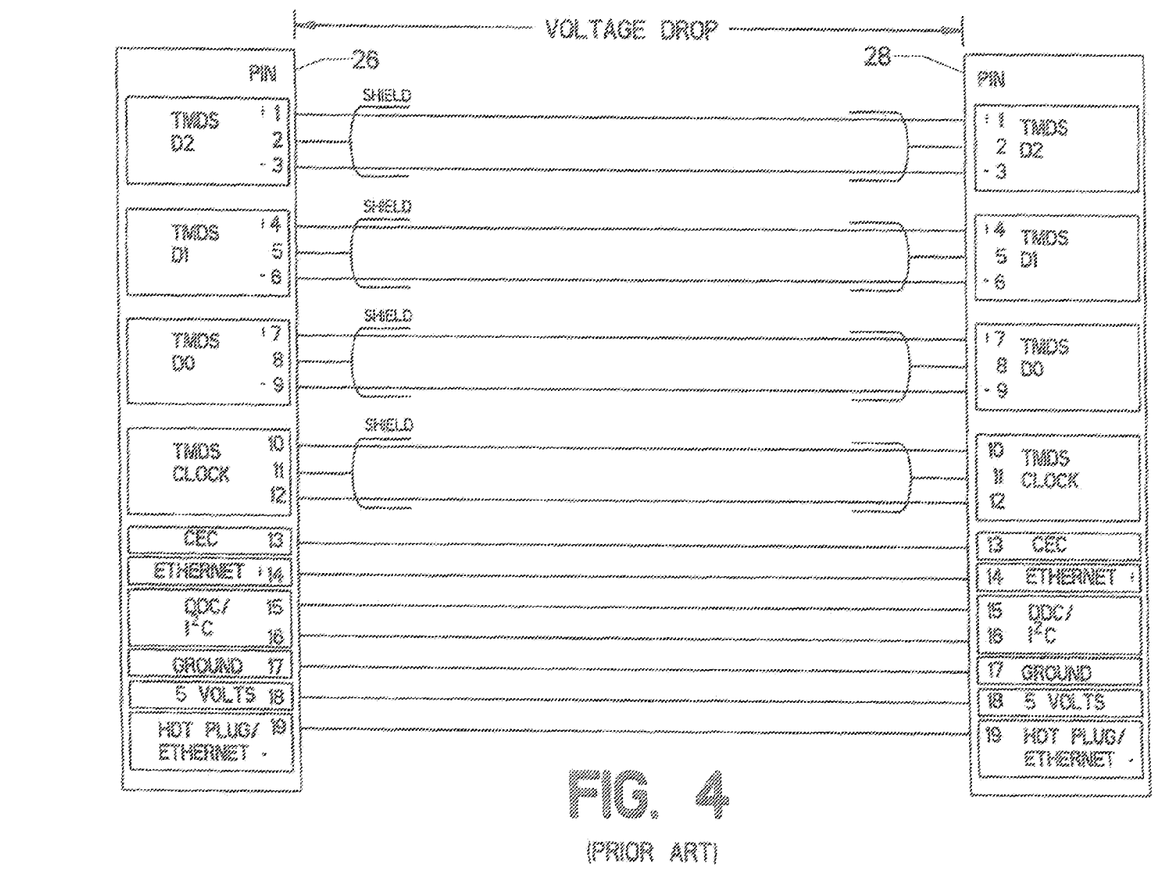
FIG. 4 is a schematic view, showing a prior art HDMI cable.

FIG. 4 shows the prior art electrical connections that are actually made by an HDMI Type A cable. Source connector 26 receives inputs on 19 different pins (numbered 1 through 19 in the view). An electrical connection is made to corresponding pins (1-19) on sink connector 28. Pins 1-12 carry the high-definition video signals. The video signals are carried in four "channels," commonly referred to as the red, green, blue, and clock channels. Transition-minimized differential signaling ("TMDS") is used for each of these channels. The "red" channel is designates as "TMDS D2" and is carried by three pins.

"Transition-minimized" ("TM") refers to a technique of bit encoding that clusters 1's and 0's together in order to minimize 1 to 0 or 0 to 1 transitions. A digital transition creates an edge of a square wave. This edge creates unwanted harmonic energy and can create electromagnetic interference. TM encoding minimizes these transitions.

"Differential signaling" ("DS") refers to a technique of sending two complementary signals on two paired wires. The polarity of the two (DC) signals is opposite. The two signals are typically fed into a subtractor on the receiving end. This device has the effect of doubling the amplitude of the desired signal while canceling any unwanted noise picked up by the transmitting lines. TMDS is the combination of "TM" and "DS" signaling.

The "TMDS D2" channel shown in FIG. 1 is carried on pins 1-3. Pin 1 is the positive half of the differential signal. Pin 3 is the negative half. Pin 2 is connected to a shield surrounding the positive and negative lines.

The "TMDS D1" channel carries the "green" signal. Pin 4 is the positive half of this differential signal while pin 6 carries the negative half. The "TMDS D0" channel carries the "blue" signal. Pin 7 carries the positive half of this signal while pin 9 carries the negative half. The "TMDS clock" channel carries the clock signal for the video feed on pins 10 and 12.

The reader will thereby appreciate that the HDMI standard uses three separate TMDS channels for the additive primary colors used in creating displayed video images. These signals are transmitted at a very high rate (3.4 GHz). Even a small change in the propagation characteristics of the copper conductors used to carry the components can cause problems. "Intra-pair skew" is defined as a difference in propagation speed between the positive and negative lines in a differential pair (such as the conductors connecting the two Pin 1's and the conductors connecting the two Pin 3's). A slight difference in arrival times for the two components of a pair can cause a data bit to fall outside of the decision boundary defined for that bit (referenced to the clock signal). Digital 1's can then become 0's and vice-versa. Small difference in conductor length, twists, and kinks in the cable can all cause these problems.

The remaining pins in the prior art HDMI cable connectors serve additional well-known functions. Pin 13 carries a Consumer Electronics Connection ("CEC") data. CEC data allows one HDMI-compatible device to control another. For example, a user can employ a remote control for a television to also control a DVD player using commands sent over the CEC.

Pins 14 and 19 in conjunction serve as an Ethernet connection. Pin 14 is the positive portion of the pair and Pin 19 is the negative portion (as well as serving an additional function).

Pins 15 and 16 are used for a Display Data Channel ("DDC") that operates over an $I^2C$ bus. The $I^2C$ bus is in fact significant to some embodiments of the present invention as it may be used to carry the signals that program the active components of the inventive HDMI cable.

Pin 17 provides a ground connection, while Pin 18 provides +5V DC. Pin 19 serves as the negative pair for an Ethernet connection when such a connection is in use. In addition, Pin 19 provides a "hot plug detect" function. The source device monitors this pin. When a receiving device is initially plugged into the cable, the source device will detect a 5 V signal on Pin 19. This hot plug detection may be used to initiate an exchange of data between the source and sink devices.

The cable connection schematically illustrated in FIG. 4 represents a purely passive device. The source and sink devices are active, but the connection between the two is simply a bundle of passive conductors. Various prior art schemes are used to facilitate accurate data transfer—such as shielding, the use of differential signaling, etc. However, the use of a passive cable introduces certain well known problems.

The simplest problem is that of voltage drop. All the conductors shown in FIG. 4 have resistance. As the length of the cable increases, the voltage drop across the conductors increases. The result is the eventual failure of some of the signals. For example, the "hot plug detect" signal may fall so far below the nominal 5V that it is simply not detected. The prior art solution to this problem has been to use larger gage conductors. This approach works to a certain extent, but it causes the cables diameters to be larger and it causes the cables to be stiffer.

A second recognized problem is that of tolerance growth. The characteristics of the prior art conductors all have associated tolerances. An example would be the conductor's resistance and impedance. The tolerances generally vary proportionally with length. As an example, if a 1 meter cable has an impedance tolerance of +/−0.1 ohms, then a 2 meter cable constructed the same way would typically have an impedance of +/−0.2 ohms. This is inherent in a passive conductor. Because the tolerances grow with increasing cable length, a point will be reached where the conductors are out of tolerance (especially critical with differential pairs). This issue limits the length of cable.

A third recognized problem is that of rise time, particularly on the $I^2C$ data bus. This bus is a simple serial interface that transmits data at a rate of 100 KHz. Rise time is driven in part by the capacitance and inductance of the receiving device. Data is bidirectional on this bus so the receiving device could be either the source or the sink. However, rise time problems resulting from the sink characteristics are most common. Increasing cable length tends to increase rise time, and this factor has also limited the effective length of prior art HDMI cables.

All these issues are inherent in the prior art HDMI cable design. The solution has been to (1) limit cable length, and (2) use large conductors. Limiting the cable length has obvious disadvantages. The use of large conductors has made the HDMI conductor bundles large in diameter and, as a result, fairly stiff. It would be advantageous to provide a solution that provides a longer cable length while retaining a relatively small diameter cable. The present invention provides such a solution.

BRIEF SUMMARY OF THE PRESENT INVENTION

The present invention comprises a method for optimizing the performance of an active HDMI cable. An active and programmable equalizer is provided within the HDMI cable itself. This device applies an individually-adjusted equalizer to each of the TMDS video data lines. Another pair of equalizers or a pair of non-equalizing amplifiers is applied to the two TMDS clock lines. An accelerator is applied to the I²C data bus. Power for the active components may be obtained by extracting a portion of the current available on the 5 VDC line. The active HDMI cable is preferably self-contained. Optionally, an external power source may be used to supplement or replace the available internal power.

The parameters controlling each of the active components (such as parameters setting gain and frequency distribution) within an individual HDMI cable are set through a programming process. The programming is preferably performed with the cable installed between the actual source and actual sink it will be connecting. The HDMI cable includes an internal controller that governs the equalizers and other active functions. A memory is connected to this controller so that settings may be retained even when power is lost. An external programmer is preferably connected to the controller within the cable. The external programmer samples the data lines in the HDMI cable and optimizes the active functions (equalizer, amplifier, or accelerator) for each line. The programmer then creates an optimized configuration for the particular installation, with the configuration containing the information needed to properly set all the HDMI cable's active functions. This optimized setting is transferred to the internal controller and associated memory within the HDMI cable. The internal controller applies the optimized settings to the active functions. In the event of a power loss or other problem, the internal controller is able to retrieve the optimized configuration from its associated memory.

REFERENCE NUMERALS IN THE DRAWINGS

| 10 | HDMI cable | 12 | connector |
|----|----|----|----|
| 14 | pin | 16 | conductor bundle |
| 18 | termination | 20 | source |
| 22 | display device | 24 | HDMI receptacle |
| 26 | source connector | 28 | sink connector |
| 42 | equalizer | 50 | nub receiver |
| 52 | vent | 54 | color nub |
| 56 | programmable equalizer | 58 | power supply |
| 60 | USB connector | 62 | equalizer circuit |
| 64 | clock recovery circuit | 66 | accelerator |
| 68 | micro controller | 70 | memory |

REFERENCE NUMERALS IN THE DRAWINGS -continued

| 72 | 5 V trigger line | 78 | programmable micro controller |
|----|----|----|----|
| 80 | start button | 82 | display |
| 84 | USB connector | 86 | sampler circuit |
| 88 | external power | 90 | power supply |
| 92 | external power | | |

DETAILED DESCRIPTION OF THE INVENTION

Figure 5:
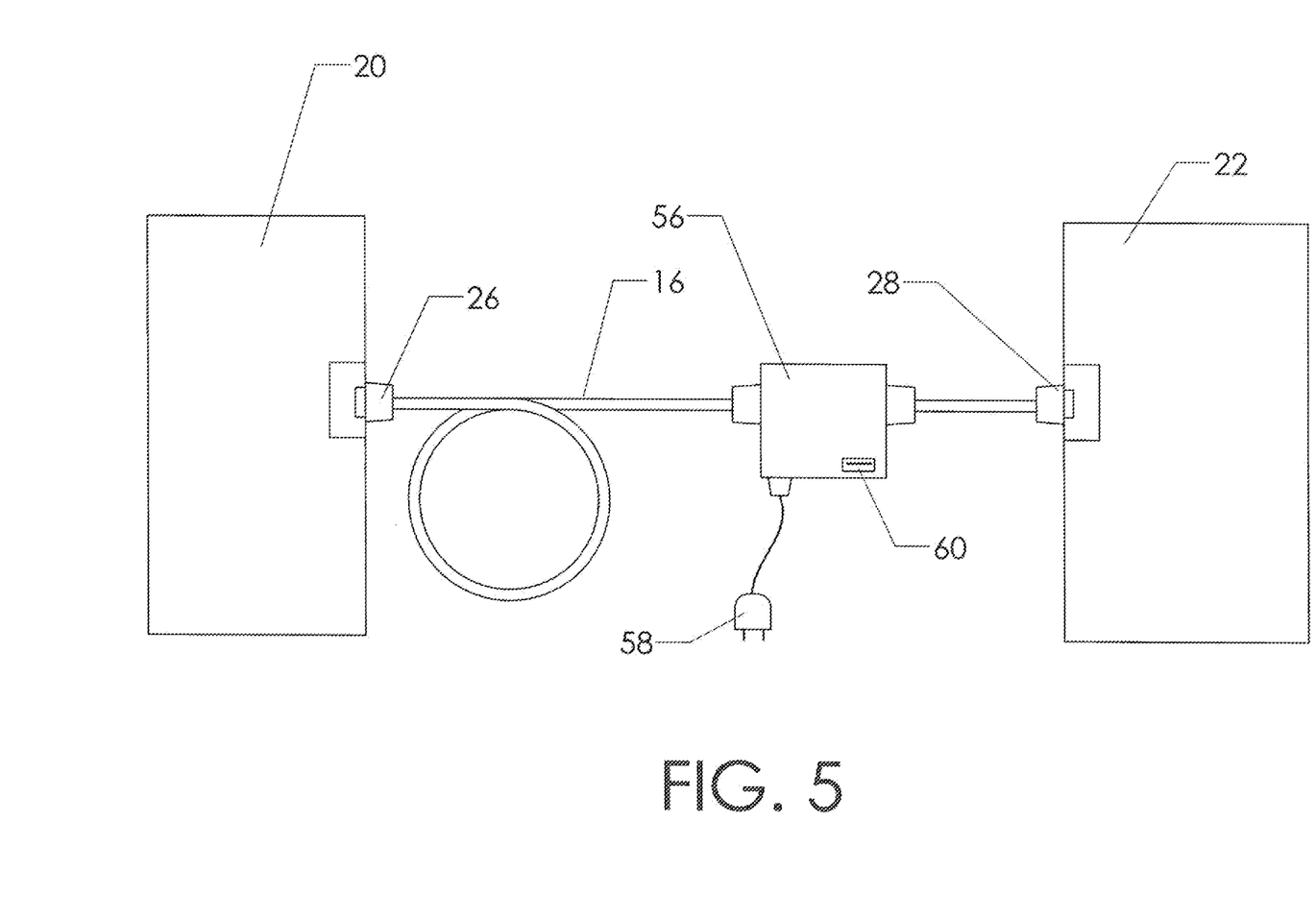
FIG. 5 is a plan view, showing one embodiment of an active HDMI cable made according to the present invention.

The present invention solves the problems inherent in the prior art HDMI cables by installing a programmable active component in the cable itself. FIG. 5 shows a simple embodiment of an HDMI cable constructed according to the present invention. The cable includes source connector 26, sink connector 28, and a plurality of conductors 16 connecting the pins on both connectors. However, unlike the prior art, programmable equalizer 56 is inserted between the two connectors. In the embodiment shown, the programmable equalizer receives programming instructions through USB connector 60. Power to the active components within the programmable equalizer is preferably taken from available sources within the HDMI cable itself (explained in more detail subsequently). Optionally, external power may be added by using an external power supply 58.

Programmable equalizer 56 is preferably placed near sink connector 28 and far from source connector 26. In fact, in the most preferred embodiments, the programmable equalizer is actually incorporated in the sink connector itself. FIG. 5 represents the programmable equalizer as a relatively large "module" within the cable. This depiction benefits the reader's understanding of where the active components typically lie in relation to the passive components. However, in the preferred embodiments, the programmable equalizer will not be so physically large and its presence will likely not even be noticeable.

Figure 6:
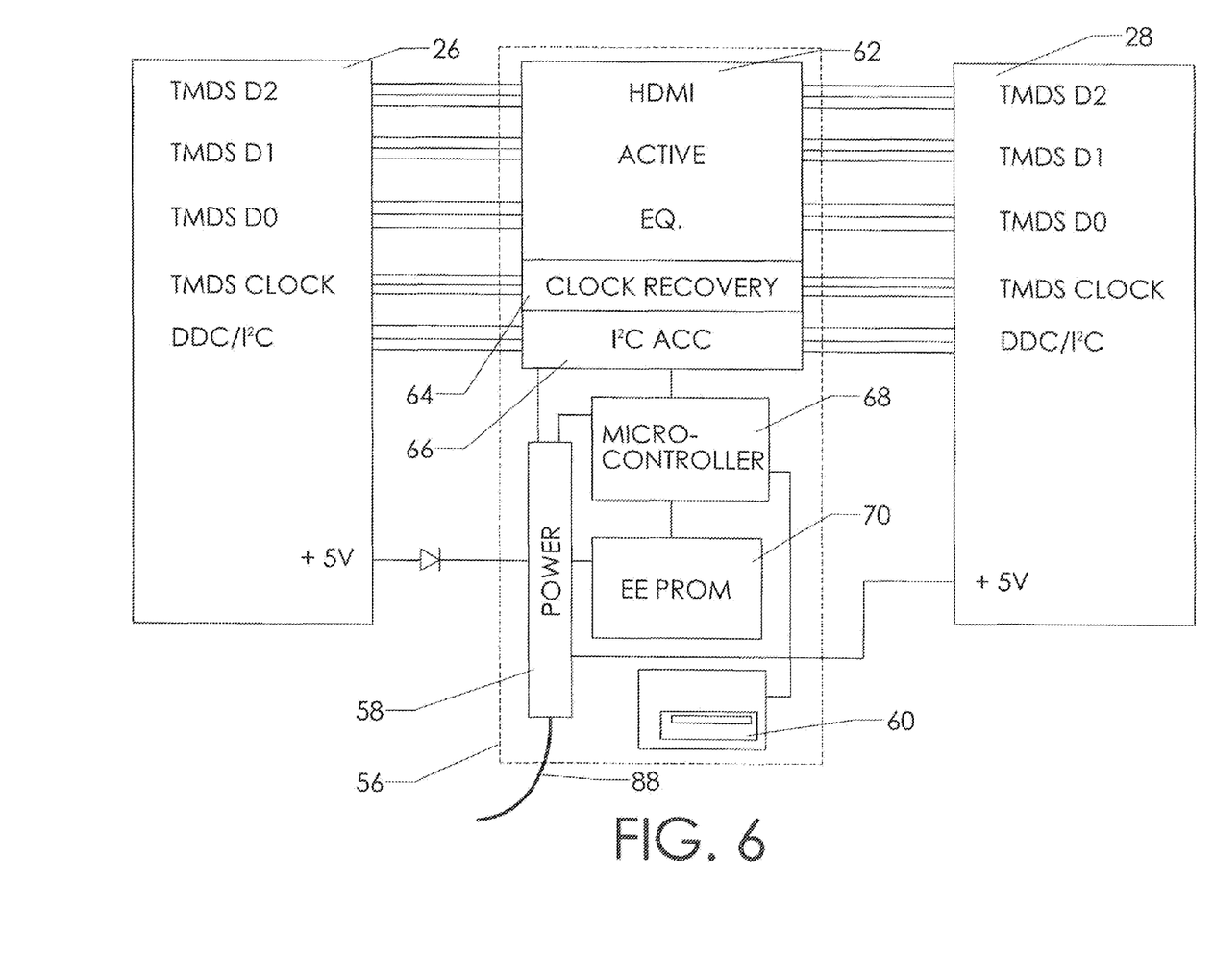
FIG. 6 is a schematic view, showing the internal configuration of one embodiment of the present invention.

FIG. 6 shows in greater detail the components lying within programmable equalizer 56. Each of the three video data lines (TMDS D2, TMDS D1, TMDS D0) are provided with an independently adjustable equalizer. Each equalizer preferably includes adjustable frequency-filtering and gain adjustments. Those skilled in the art will know that each TMDS data line includes two conductors (and a passive shield). Thus, HDMI active equalizer 62 preferably contains six independently-adjustable equalizers.

The TMDS clock signal is carried on two data lines. Clock recovery circuit 64 is able to recover the TMDS clock signal should it lose performance. This circuit may be optimized separately from the functions of the HDMI active equalizer. Finally, accelerator 66 is an I²C accelerator designed to minimize the amount of capacitive loadings that may occur over long distances. It operates on the DDC/I²C lines (pins 15 and 16) in the HDMI cable.

Programmable equalizer 56 includes an on-board microcontroller 68. Memory 70 is associated with the microcontroller. USB connector 60 allows communications with the microcontroller (and may also be used for power). Power supply 58 provides properly conditioned electrical power to all the components within the programmable equalizer. As shown, it may draw electrical power from the +5V line on HDMI pin 18 and possibly from excess power available on the TMDS lines. External power 88 may also be provided, preferably from an external USB cable through USB connector 60. Those skilled in the art will know that many sink devices contain a USB port and it is possible to provide power to the programmable equalizer by connecting USB connector 60 to such an available USB port. In the preferred embodiment, all the components shown within the phantom line on FIG. 6 are combined into a single circuit board and possibly even into a single integrated circuit.

Microcontroller 68 is able to independently adjust all the controlling parameters used by HDMI active equalizer 62, clock recovery circuit 64, and accelerator 66. The optimized values for these parameters may be stored in memory 70. Then, in the event the parameters must be reloaded (such as after a power failure), microcontroller 68 can retrieve the values from memory 70 and apply them.

Figure 7:
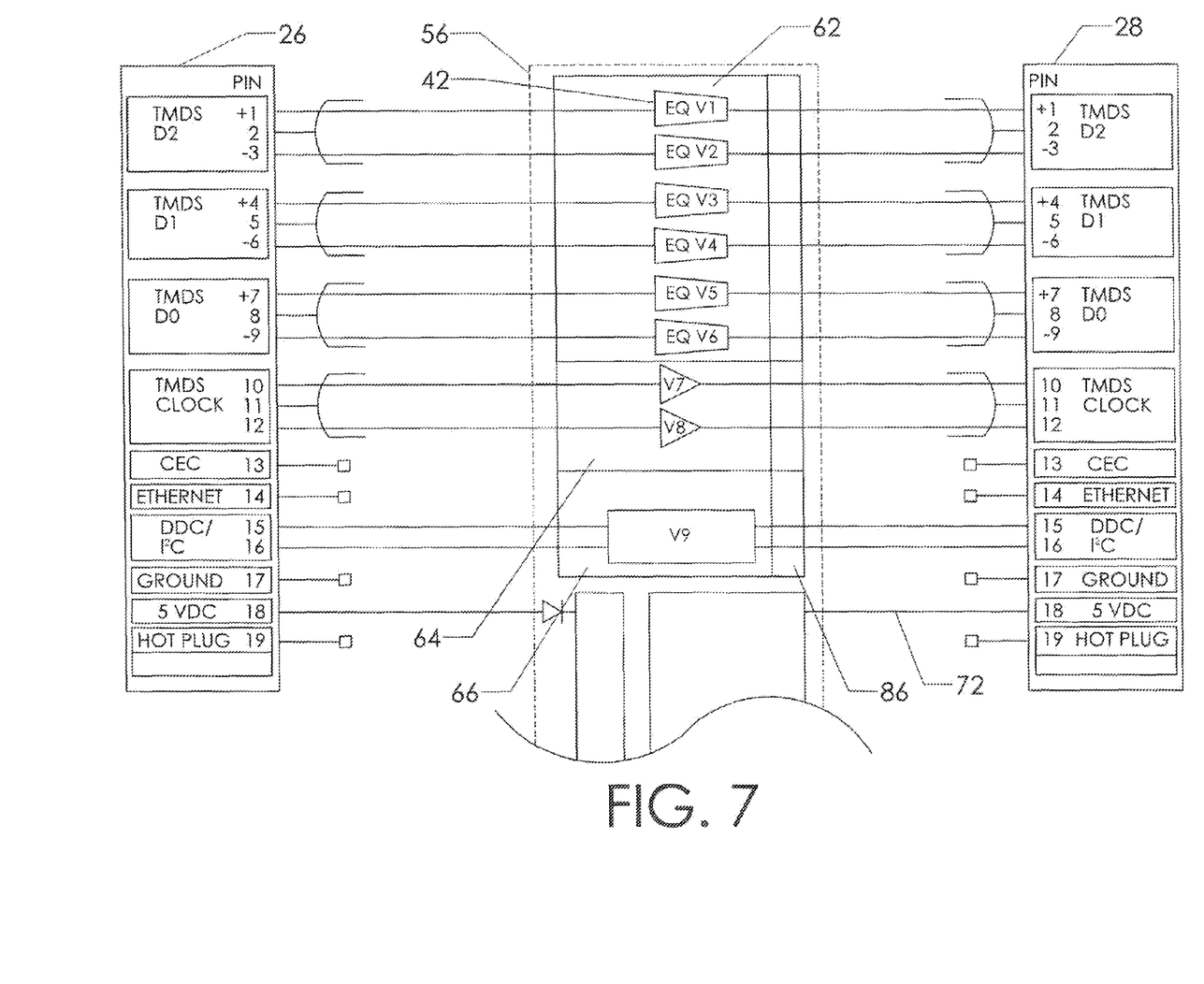
FIG. 7 is a schematic view, showing additional details of the embodiment of FIG. 6.

FIG. 7 shows additional detail regarding some of the components within programmable equalizer 56. Each of the lines within each TMDS signaling pair is provided with its own equalizer 42. In order to cover the three video data channels, six equalizers 42 are provided. Each equalizer is governed by software parameters that preferably control (1) gain, (2) frequency distribution, and (3) time skew. These parameters may be set individually for each equalizer. The frequency distribution may be set in order to boost the desired signal frequencies while attenuating unwanted frequencies that are typically produced by electromagnetic interference phenomena. The time skew feature allows adjustment between the two lines of a particular signaling pair so that the pairs arrive simultaneously at the sink connector.

A simple gain adjustment parameter is provided for each of the lines within the TMDS clock pair. Frequency adjustment is not typically needed for these lines. However, one certainly could substitute an equalizer for the simple amplifying devices shown.

Accelerator 66 is provided to address rise time issues occurring on the I²C bus. This bus line may encounter rise time issues that cause data transmission errors (both ways) and/or reduce the available data transmission speed. Accelerator 66 reduces the rise time delays and produces a more "square" edge in the transitions for the defined logic low-voltage state to the defined high-voltage state.

Many of the defined HDMI pins may be simple "pass-throughs" that are not affected by the inventive device. For example, the CEC data on pin 13 is simply passed through in the embodiment shown. The depiction of a connection symbol on pins 13, 14, 17, and 19 in FIG. 7 is intended to mean that these pins are connected from source connector 26 to sink connector 28 without any alteration by the programmable equalizer (though other embodiments could certainly operate on one or more of these lines as well).

Part of the power required by programmable equalizer 56 may be provided by the 5 volts available on Pin 18 of the HDMI connector (shown connected through a diode in FIG. 7). However, under the HDMI standard, only 55 mA of current is available on this line. More power may be needed for certain embodiments, and this is typically supplied via the external USB connection.

Sampler circuit 86 is used to sample the signal on each line emerging from the programmable equalizer. The sampling circuit may assume many different forms. The precise form is not significant to the present invention as long as it is able to accurately sample the signal as it leaves the programmable equalizer.

Returning now to FIG. 5, one of the main advantages of the present invention will be explored. The programmable equalizer operates primarily on the unidirectional TMDS data signals (the three colors plus the clock). The performance of these signals often determines the length limit of an HDMI cable. The TMDS data signals are very fast signals (3+GHz) and performance degradation in these signals often limits the length of the cable. Sampler circuit 86 is preferably configured to sample the signals as close as practicable to sink connector 28. Source 20 and display device 22 need not be standardized calibration units. It is in fact desirable to connect the HDMI cable between the actual source and sink that the user desires to use. As an example, the HDMI cable might be connected between a satellite receiver and a video display. The sampler circuit is then able to sample the signal coming through after it has passed through conductor bundle 16 and while it is being subjected to any effects created by the display device.

For example, sampler circuit 86 preferably "sees" the signal after it has (1) suffered any resistance losses and time skew introduced by the long HDMI cable run, and (2) suffered rise time and other issues introduced by the sink device. The information gathered by the sampler circuit is used to program programmable equalizer 56 so that it is optimized for the particular installation. This optimization will allow cable lengths of 30 meters or more, while still using relatively small-diameter conductors.

Returning now to FIG. 7, the reader will observe that each equalizer operates on one of the paired conductors in a TMDS data channel. The performance of the signal on each pair may be plotted as the familiar "eye pattern" on an oscilloscope display. While such patterns are well known to those skilled in the art, some explanation may benefit the reader's understanding.

An eye pattern is created on an oscilloscope display by repetitively sampling a digital data signal. The digital data signal is applied to the oscilloscope's vertical input while the nominal data rate is used to trigger the horizontal sweep. While such a display can be produced on the screen of a stand-alone oscilloscope, it is now more commonly produced using a computer with data sampling hardware and software.

However it is created, an eye pattern quickly and intuitively demonstrates many performance characteristics of the signal being sampled. For instance, studying an eye pattern allows an engineer to quickly determine if the signals are poorly timed, are poorly synchronized with the clock signal, are too noisy, change too slowly, or include amplitude discrepancies. An "open eye" pattern generally corresponds to minimal signal distortion. The term "open eye" refers to the fact that a large area having no signal traces exists in the middle of the plot. Distortion of the signal waveform appears as a partial closure of this "open eye."

The six equalizers 42 shown in the view are preferably amplifying equalizers. Software parameters are individually set for these equalizers (V1 through V6). These parameters may control the gain and the frequency band to which the gain is applied. The parameters are adjusted to minimize eye closure. A good threshold to use in setting these parameters is to keep the eye closure above a 20% minimum eye limit.

In the embodiment depicted, two parameters (V7 and V8) are used to independently adjust clock recovery circuit 64. Another parameter (V9) is provided to control accelerator 66. In many embodiments, multiple parameters will be used for each active device, resulting in far more than 9 parameters.

The accelerator typically operates to sharpen the transition from the logic "0" state to the logic "1" state. Its function combats rise time delays that are often created by the sink component. The connection of multiple devices to an I²C bus can create high bus capacitance (well beyond the 400 pF limit set by the specification). As explained previously, this capacitive loading causes slow rise times across all the components connected to the bus. Even where only two components are using the bus, poor performance in one of these can cause slow rise times and ultimately affect data speed and reliability. The accelerator preferably uses a boosted pull-up current during the rising bus transitions (in order to accelerate the "0" to "1" transition) while disabling the current sources during the falling bus transitions (in order to accelerate the "1" to "0" transition). The result improves the performance of the cable itself, and can even "fix" rise time problems caused by external components that are connected to the cable.

As stated previously, the active devices within programmable equalizer 56 can be adjusted using the on board microcontroller. The use of these programmable parameters is one of the principle advantages of the present invention, as it allows each individual cable to be "tuned" for best performance while it is actually connected to the source and sink devices with which the cable will be used. In order to understand the need for this process, it is helpful for the reader to understand some of the manufacturing processes used to create the cable.

One might naturally think that a fixed set of parameters could be used for each model of cable produced. The term "model" refers to one particular specification. For example, a cable specification might call for a 1 meter overall length, with the TMDS conductors being 40 American Wire Gage (a diameter of 0.00314 inches, or 0.0799 mm). One might think that a fixed value for gain and frequency distribution could be set for the equalizers used in this cable model. While this could be done, it would sacrifice a big advantage the present invention makes possible.

Not all conductors meeting the 40 AWG standard are alike. For example, a 40 AWG conductor is considered to be in specification if it falls within 0.0002 inches of the nominal value. Thus, the two conductors comprising a signal pair in a TMDS data channel might have diameters of 0.00294 inches and 0.00334 inches. The resistance of a conductor is linearly proportional to its cross-sectional area (within certain limits). The larger of the two conductors has a cross-sectional area that is 14% greater than the smaller. The electrical characteristics of the two conductors will be similarly different. While this represents an extreme case, even much smaller variations can affect cable performance. In addition, the result of the variations thus described increase linearly with cable length. A tolerance for the cross-section of the conductors used does not translate to a static value for the tolerance of the conductor itself. The tolerance of the resistance of the conductor itself—for example—increases proportionally with increasing cable length. Thus, a tolerance range that is acceptable for a 1 meter cable may be unacceptable for a 2 meter cable. And, the tolerance with respect to the conductor diameter is only one among several significant quantities. The purity of the conductor material, the consistency of the drawn cross-section, and the metal grain characteristics all affect the electrical properties.

The reader will thereby perceive that a "standard" set of parameters for each cable model may produce a good result for one particular example of that cable model and a bad result for another. The prior art approach to this recognized problem has been to use large conductor wires in order to create a large margin for voltage loss, low resistance, etc. This approach increases cost and decreases the flexibility of the cable. The present invention avoids these problems by "custom tuning" each individual cable.

Figure 8:
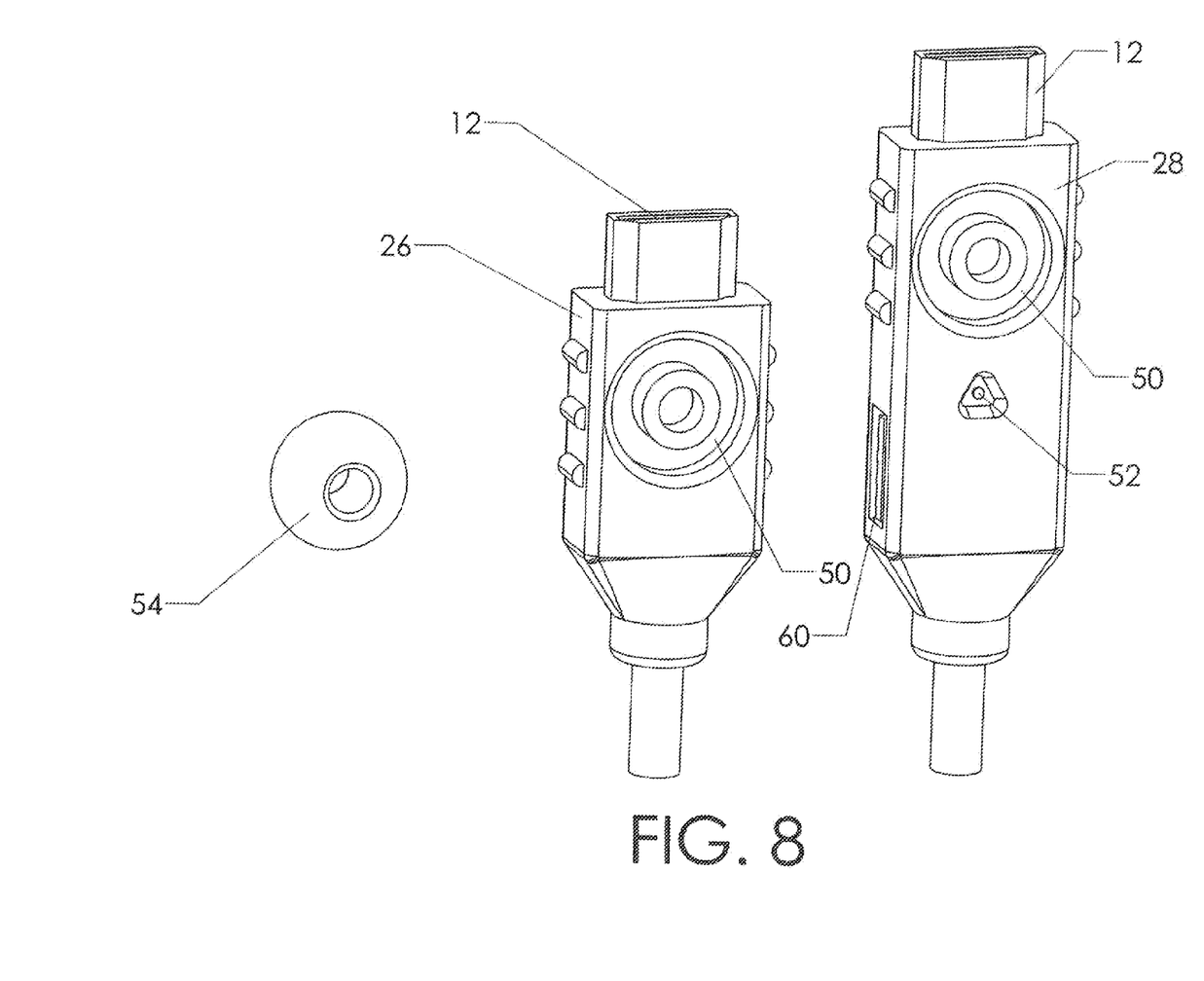
FIG. 8 is a detailed perspective view, showing how the internal controller and associated memory may be stored within a single extended HDMI plug.

The process of analyzing and tuning the cable is preferably performed by an external programmer. FIG. 8 serves to illustrate why the use of an external programmer is preferable. FIG. 8 shows an embodiment of the invention in which the active components of the programmable equalizer have been efficiently packaged so that they fit within a lengthened version of sink connector 28 itself.

Sink connector 28 may need to be somewhat elongated so that it can house the components of the programmable equalizer and USB connector 60. Vent 52 is preferably provided to allow the circulation of ambient air in order to cool the active electronics. Both source connector 26 and sink connector 28 include an HDMI connector 12 conforming to the description given previously.

The use of an external programmer allows a more compact embodiment—as depicted in FIG. 8. In addition, the use of an external programmer reduces the cost of the system, since one programmer may be used to program many different active HDMI cables. The actual programming does not take much time and, once the parameters are set, a particular HDMI cable has no need of further programming unless the installation is changed.

Figure 9:
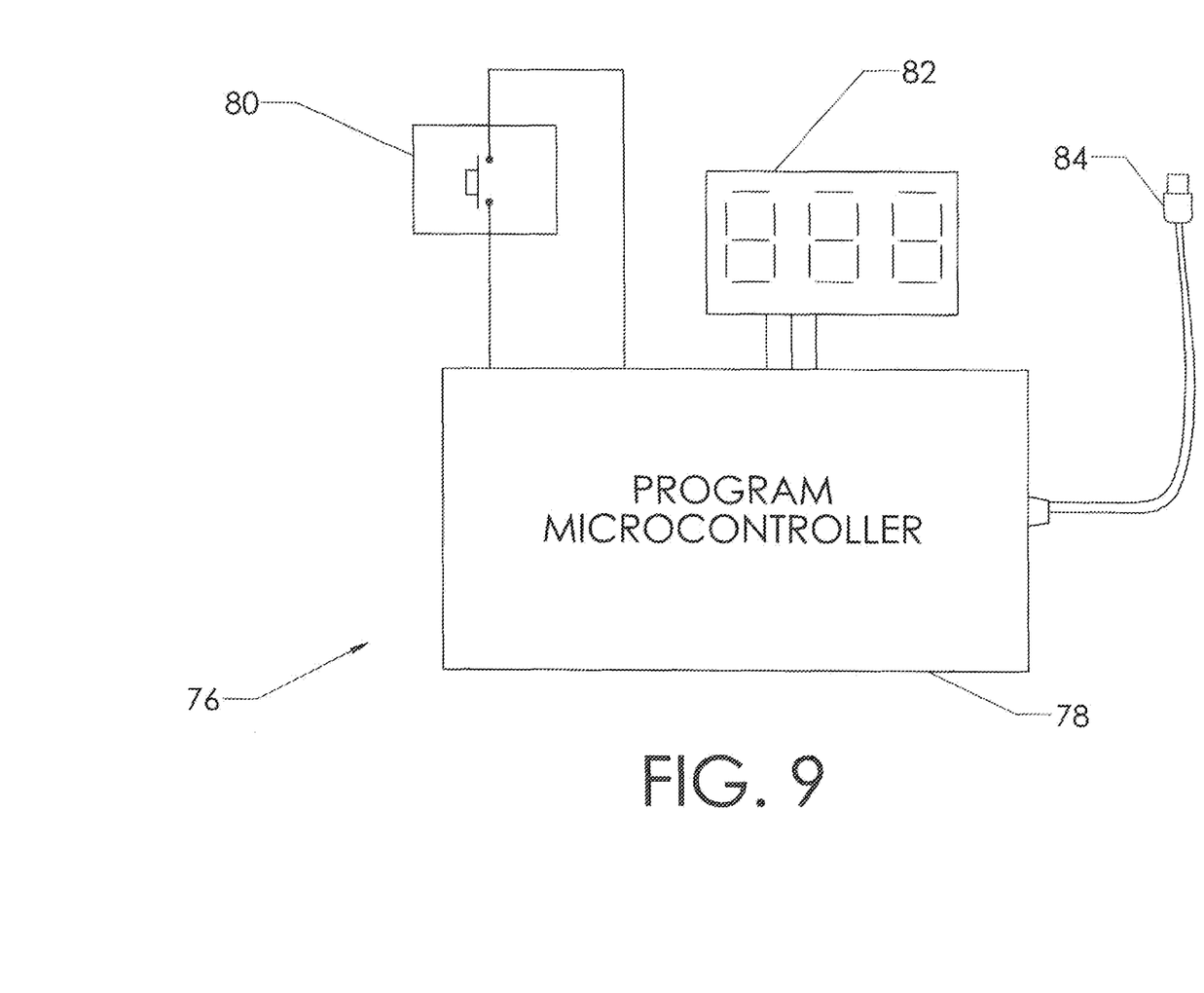
FIG. 9 is a schematic view, showing one embodiment of the programmer used in the present invention.

FIG. 9 schematically depicts an embodiment of an external programmer—designated as programmer 76. Program microcontroller 78 runs the software needed to perform the programming process. An associated memory may be used to retain the actual code. USB connector 84 allows programmer 76 to communicate with a particular active HDMI cable.

The preferred method of use is for the user to connect a particular active HDMI cable between the source and sink devices it will connect in normal use. The user next plugs USB connector 84 into USB connector 60 (shown in FIG. 8) on the active HDMI cable. Returning to FIG. 9, the user then presses start button 80 to begin the process.

While signals are being sent from the source device to the sink device, programmer 76 uses sampler circuit 86 to measure the signal on each of the relevant signal lines within the HDMI cable. The signals may be measured one at a time or they may be measured in parallel. Programmer 76 sends instructions to the microcontroller onboard the active HDMI cable causing each of the active components to step through its possible settings until an optimized signal is found for the line that the particular active component controls. For example, the equalizer on the TMDS D2 positive line (pin 1) may be adjusted in frequency and gain until an optimized signal results. The parameter settings producing the optimized signal are preferably retained by the programmer.

Those skilled in the art will realize that some compromise between the optimum results for each individual conductor may need to be considered. For example, considerations of intra-pair skew may make it preferable to iteratively adjust the two lines of the pair until an optimum result for the pair as a whole is achieved. The same may be true for inter-pair skew.

Once the external programmer determines the optimized settings for programmable equalizer 56, it is preferable to save the optimized settings as a single digital "word" so that it may be easily stored and retrieved. The reader should note that the optimized settings may be saved in a virtually endless variety of ways, including providing sufficient memory to save an individual value for each individual parameter in an 8-bit or 16-bit format. However, in the preferred embodiments, a simpler and more efficient method is used.

In the preferred embodiment, complete control of the active electronics is achieved using a 3-bit digital word. An individual 3-bit signal consists of 3 data bits. These are used to create a binary coded decimal ("BCD") word. The following table presents a common 3-bit format:

| Bit | first | second | third |
|---|---|---|---|
| Decimal value | 1 | 2 | 4 |

The first bit in the sequence is conventionally the most significant while the last is the least significant. A 3-bit word may be used to represent any digital number between 0 and 7. The following table illustrates this concept:

| Bit Sequence | Decimal Equivalent |
|---|---|
| 000 | 0 |
| 001 | 1 |
| 010 | 2 |
| 011 | 3 |
| 100 | 4 |
| 101 | 5 |
| 110 | 6 |
| 111 | 7 |

One or more such 3-bit BCD words may be used. For example, three such BCD words may be used in combination to define a particular configuration for all the parameters within programmable equalizer 56. This would allow any value between 0 and 777 (778 total values). A number in this available range thereby defines completely the optimized settings for a particular HDMI cable (as installed).

Looking at FIGS. 8 and 9, this BCD number is transferred from the programmer to the microcontroller within the HDMI cable via the connection of USB connector 84 to USB connector 60. Looking again at FIG. 6, the single BCD number is transferred into memory 70 on board the HDMI cable. Depending on the type of memory used, the actual transferring may be "written" by the external programmer or the onboard microcontroller. However, it is certainly preferable for the memory to be non-volatile so that it persists through extended periods of power interruption. Microcontroller 68 is able to retrieve the value from the memory and uses this to actually set the appropriate values for the active components it controls.

Returning now to FIG. 9, it is also possible to provide one or more status displays on the external programmer. For example, a three-character digital display 82 may be provided. This display could be configured to flash as the programming process for a particular cable commences and to display the three-digit value that represents the optimized settings when the process is complete.

Figure 10:
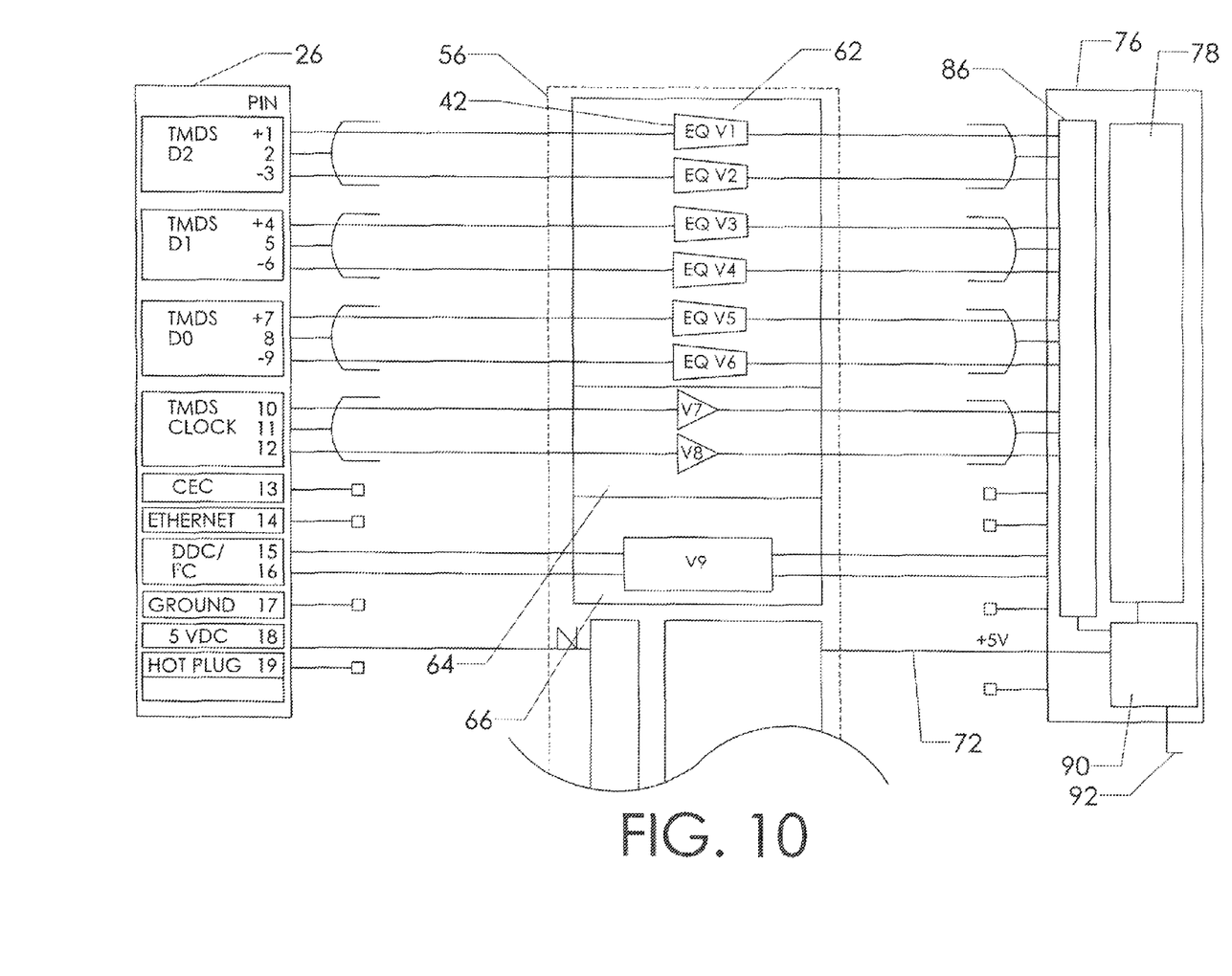
FIG. 10 is a schematic view, showing an additional embodiment of the programmer.

Those skilled in the art will realize that an external programmer could be connected to the HDMI cable in other ways. FIG. 10 shows one such alternate embodiment. Programmer 76 in the embodiment of FIG. 10 does not use a USB connector to communicate with the active HDMI cable. Instead, it uses the HDMI sink connector on the cable itself. The external programmer is plugged into the HDMI cable in the place of the sink device. Sampler circuit 86 then "looks" at each signal as it emerges from the sink connector on the HDMI cable. The operation of programmable microcontroller 78 is the same as for the prior embodiment. Power is provided to the programmer by the +5V HDMI line, an external power line 92, or some other source. Communication back to microcontroller 68 onboard the HDMI cable is accomplished via the I²C bus in the HDMI cable itself.

The embodiment of FIG. 10 is less than optimal because it eliminates the effects created by the sink device the HDMI cable will ultimately be connected to (rise-time issues being an obvious example of these). However, it does allow some optimization of the cable that considers the characteristics of both the source device and the cable itself.

Returning to the very simple depiction of FIG. 5, the reader will appreciate some advantages in placing sampler circuit 86 near sink connector 28. The invention allows the creation of very long HDMI cables—35 meters or more in length. A main focus of the invention is the retention of appropriate signal characteristics after such a long run. The active components of the HDMI cable (equalizers, etc.) may be placed at the source end of the cable, at the sink end, or at some point in between. However, it is the signal that actually emerges from the sink end that is of significant importance. Thus, the signal should be sampled near the sink end. In order to consolidate the sampling circuitry and the active components, it makes sense to place the active components near the sink end as well. This will be true for many embodiments.

The process thus described may be an iterative process in some cases. An adjustment command will be sent and the parameters will be altered accordingly. A new series of measurements are taken and an additional adjustment or adjustments may then be determined and transmitted. Those skilled in the art will realize that the creation of a suitable "open eye" pattern for the TMDS data channels may in fact require several iterations and some empirical experimentation. This entire process may be automated using the software that controls the programming unit.

As an example, one parameter may adjust the gain for the amplifiers in the transmission lines for the TMDS clock signal. When the clock signal is first received in the programming unit, its logic "high" voltage may be measured as falling below the desired threshold criterion. In that case the programming unit sends commands that reset the controlling parameters to raise the gain. The received values are then measured again and the process repeats until the results are satisfactory.

Each cable programmed using this technique will get its own set of "custom" parameters and it is unlikely that any two cables will receive exactly the same set of parameters. In addition, the reader should appreciate that an optimized set of parameters for a particular HDMI cable may depend on the source and sink devices it is connected to. If the cable is used to connect different devices, it may be desirable to reprogram it. Of course, the reprogramming may be easily accomplished by again connecting the external programmer and initiating the programming sequence.

The use of the active compensation within the cable itself creates several significant advantages. These include: (1) a smaller conductor size for a given length of cable; (2) a smaller overall conductor bundle diameter; (3) greater mechanical flexibility of the cable; and (4) a fixed tolerance for the transmission characteristics regardless of the cable's length.

Using the present invention it is possible to provide an HDMI cable that is long, thin, and flexible. In some instances, the terminations of several such cables will be located in close proximity to each other. An example is the use of a rack-mounted video system that may have four or more HDMI receptacles in a stack. When several such cables are routed along a common path it can become difficult to determine which connector belongs to which cable. The embodiment of FIG. 8 includes a feature intended to assist with this problem.

The particular embodiment shown in FIG. 8 includes a nub receiver 50. Color nub 54 is configured to snap into this nub receiver, where it will remain in place unless deliberately removed by a user. Multiple color nubs 54 are provided in a variety of colors. For example, color nubs that are green, red, yellow, blue, magenta, and white can be provided.

These nubs assist with cable management. For example, a user can place red color nubs on the two ends of a first cable and blue color nubs on the two ends of the second cable. The user may then easily determine which connector belongs to a particular cable.

Having received an explanation of the general characteristics of the present invention, the reader will benefit from an explanation of some additional detailed features and specific examples. Returning to FIG. 6, the reader will recall that programmable equalizer 56 contains multiple active components that require power to operate. As stated previously, some of the required power is taken from Pin 18 on the HDMI cable. However, because this line is limited to 55 mA of current under the HDMI standard, more power must likely be obtained elsewhere. It is possible to scavenge additional power by taking surplus power from each of the TMDS video channels, as explained in the parent application. However, in the preferred embodiments, any additional required power is supplied by an external USB cable.

Active HDMI cables made according to the present invention have been made in lengths of 1 meter, 3 meters, 5 meters, 10 meters and more. The following performance criteria represent some of the preferred embodiments:

(1) High frequency digital video transmitted at 3.4 Gb/s supporting a minimum of 20% Eye Amplitude (referring to the "eye diagram" discussed previously);

(2) Voltage drops over the 5 VDC supply line (Pin 18) limited to 300 mV;

(3) I$^2$C capacitive loading rise times limited to 800 ns;

(4) Intra-pair skew within the TMDS lines limited to 115 ps;

(5) Hot plug voltage drop limited to 2 V;

(6) Overall diameter of conductor bundle not to exceed 3.5 mm;

(7) Wire gage used for conductors—customized for length of cable desired; and (8) Dimensional shielding—customized for high frequency emissions.

The reader should note that adjusting the parameters to meet the predefined signal criteria may not be simply a matter of ramping up the gain on the various amplifiers. The parameters must be adjusted to create a balanced system. For example, the available gain is limited by the total amount of power available in those embodiments lacking an external power source and this must be considered. As another example, simply ramping up the gain will not create the desired "open eye" signal for the TMDS data lines. Gain must often be adjusted along with frequency distribution and skew in order to meet the desired 20% eye amplitude.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

The invention claimed is:

1. A method for improving signal quality in an active HDMI cable connecting a source device that will actually be used with the cable as installed to a sink device that will actually be used with the cable as installed, comprising:
   a. providing an active HDMI cable, including,
      i. a positive TMDS D0 conductor,
      ii. a negative TMDS D0 conductor,
      iii. positive TMDS D1 conductor,
      iv. a negative TMDS D1 conductor,
      v. a positive TMDS D2 conductor,
      vi. a negative TMDS D2 conductor,
      vii. a positive TMDS clock conductor,
      viii. a negative TMDS clock conductor,
      ix. a source connector,
      x. a sink connector,
   b. providing a programmable equalizer in said active HDMI cable proximate said sink connector, said programmable equalizer including,
      i. a first equalizer on said positive TMDS D0 conductor, said first equalizer including at least a variable gain said gain being set by a programmable parameter;
      ii. a second equalizer on said negative TMDS D0 conductor, said second equalizer including at least a variable gain with said gain being set by a programmable parameter;
      iii. a third equalizer on said positive TMDS D1 conductor, said third equalizer including at least a variable gain with said gain being set by a programmable parameter;
      iv. a fourth equalizer on said negative TMDS D1 conductor, said fourth equalizer including at least a variable gain with said gain being set by a programmable parameter;
      v. a fifth equalizer on said positive TMDS D2 conductor, said fifth equalizer including at least a variable gain with said gain being set by a programmable parameter;
      vi. a sixth equalizer on said negative TMDS D2 conductor, said sixth equalizer including at least a variable gain with said gain being set by a programmable parameter;
   c. providing a measurement unit configured to measure a signal on each of said TMDS conductors proximate said sink connector;
   d. providing a microcontroller connected to said programmable equalizer, said microcontroller having the ability to set said programmable parameters for each of said equalizers, said microcontroller having an associated memory storing a predefined set of performance criteria for each of said TMDS conductors;
   e. connecting said source connector in said active HDMI cable to said source device and said sink connector to said sink device;
   f. activating said source device and said sink device so that signals from said source device are sent through said active HDMI cable and received by said sink device;
   g. while said signal is passing through said active HDMI cable from said source device to said sink device, using said measurement unit to measure a signal on each of said TMDS conductors;
   h. using said microcontroller in said programmable equalizer to vary said set of programmable parameters in order to vary the gain in each of said equalizers while said measurement unit measures an output signal emerging from each of said equalizers in order to determine an optimum configuration for all of said programmable parameters;
   i. using said microcontroller to set said optimum configuration for all of said programmable parameters;
   j. determining a total amount of power available for said equalizers by,
      i. determining an amount of power available on a 5 volt DC supply line in said active HDMI cable, and
      ii. determining an additional amount of power available as excess power on said TMDS conductors.

2. A method for improving signal quality in an active HDMI cable as recited in claim 1, further comprising:
   a. providing a non-volatile memory accessible by said microcontroller; and b. storing said optimum configuration for all of said programmable parameter in said non-volatile memory.

3. A method for improving signal quality in are active HDMI cable as recited in claim 2, further comprising:
   a. retrieving said optimum configuration for all of said programmable parameters from said non-volatile memory; and
   b. using said microcontroller to set said optimum configuration or all of said programmable parameters.

4. A method for improving signal quality in an active HDMI cable as recited in claim 1, said sink device having USB connector, further comprising:
   a. providing a USB connector on said active HDMI cable, separate from said source and sink connectors, proximate said programmable equalizer;
   b. providing a USB cable; and
   c. connecting said USB cable between said USB connector on said sink device and said USB connector on said active HDMI cable, said USB cable providing electrical power to said programmable equalizer.

5. A method for improving signal quality in an active HDMI cable as recited in claim 4, further comprising:
   a. providing an external programmer having a connector; using said measurement unit to sample said output signal emerging from each of said equalizers;
   c. feeding said output signal information from said measurement unit to said external programmer using a detachable connection between said active HDMI cable and said external programmer;
   d. using said external programmer to vary said programmable parameters in said microcontroller onboard said active HDMI cable while said output signal information is monitored by said external programmer;
   e. using said external programmer to determine an optimum configuration for all of said programmable parameters;
   f. sending said optimum configuration from said external programmer to said active HDMI cable; and
   g. setting said optimum configuration within said active HDMI cable.

6. A method for improving signal quality in an active HDMI cable as recited in claim 5, further comprising;
   a. providing a non-volatile memory in said programmable equalizer; and
   b. storing said optimum configuration for all of said programmable parameters in said non-volatile memory.

7. A method for improving signal quality in an active HDMI cable as recited in claim 1, wherein said programmable equalizer is contained within said sink connector.

8. A method for improving signal quality in active HDMI cable as recited in claim 1, further comprising:
   a. providing an external programmer;
   b. using said measurement unit to sample said output signal emerging from each of said equalizers;
   c. feeding said output signal information from said measurement unit to said external programmer;
   d. using said external programmer to vary said programmable parameters in said microcontroller onboard said active HDMI cable while said output signal information is monitored by said external programmer;
   e. using said external programmer to determine an optimum configuration for all of said programmable parameters;
   f. sending said optimum configuration from said external programmer to said active HDMI cable; and
   g. setting said optimum configuration within said active HDMI cable.

9. A method for improving signal quality in an active HDMI cable as recited in claim 8, further comprising:
   a. providing a non-volatile memory in said programmable equalizer; and
   b. storing said optimum configuration for all of said programmable parameters in said non-volatile memory.

10. A method for improving signal quality in an active HDMI cable as recited in claim 9, further comprising storing said optimum configuration as a binary coded decimal word.

11. A method for improving signal quality in an active HDMI cable connecting a source device that will actually be used with the cable as installed to a sink device that will actually be used with the cable as installed, comprising:
    a. providing an active HDMI cable, including a plurality of TMDS conductors, a source connector, and a sink connector;
    b. providing a programmable equalizer in said active HDMI cable proximate said sink, connector, said programmable equalizer including a plurality of equalizers, each of said equalizers being capable of independently varying a gain on one of said TMDS conductors, with said gain being set by a programmable parameter;
    c. providing a measurement unit configured to measure a signal on each of said TMDS conductors proximate said sink connector;
    d. providing a microcontroller connected to said programmable equalizer, said microcontroller having the ability to set said programmable parameters for each of said equalizers;
    e. connecting said source connector in said active HDMI cable to said source device and connecting said sink connector in said active HDMI cable to said sink device;
    f. activating said source device and said sink device so that signals from said source device are sent through said active HDMI cable and received by said sink device;
    g. while said signal is passing through said active HDMI cable from said source device to said sink device, using said microcontroller in said programmable equalizer to vary said set of programmable parameters in order to vary the gain in each of said equalizers while measuring an output signal emerging from each of said equalizers in order to determine an optimum configuration for all of said programmable parameters;
    h. using said microcontroller to set said optimum configuration for all of said programmable parameters;
    i. determining a total amount of power available for said equalizers by,
       i. determining an amount of power available on a 5 volt DC supply line in said active HDMI cable, and
       ii. determining an additional amount of power available as excess power on said TMDS conductors.

12. A method for improving signal quality in an active HDMI cable as recited in claim 11, further comprising:
    a. providing a non-volatile memory accessible by said microcontroller; and
    b. storing said optimum configuration for all of said programmable parameters in said non-volatile memory.

13. A method for improving signal quality in an active HDMI cable as recited in claim 12, further comprising:
    a. retrieving said optimum configuration for all of said programmable parameters from said non-volatile memory; and
    b. using said microcontroller to set said optimum configuration for all of said programmable parameters.

14. A method for improving signal quality in an active HDMI cable as recited in claim 11, said sink device having a USB connector, further comprising:

a. providing a USB connector on said active HDMI cable, separate from said source and sink connectors, connected to said programmable equalizer; and
b. connecting as USB cable between said USB connector on said sink device and said USB connector on said active HDMI cable, said USB cable providing electrical power to said programmable equalizer.

15. A method for improving signal quality in an active HDMI cable as recited in claim 14, further comprising:
a. providing an external programmer having a connector; using said measurement unit to sample said output signal emerging from each of said equalizers;
c. feeding said output signal information from said measurement unit to said external programmer using a detachable connection between said active HDMI cable and said external programmer;
d. using said external programmer to vary said programmable parameters in said microcontroller onboard said active HDMI cable while said output signal information is monitored by said external programmer;
e. using said external programmer to determine an optimum configuration for all of said programmable parameters;
f. sending said optimum configuration from said external programmer to said active HDMI cable; and
g. setting said optimum configuration within said active HDMI cable.

16. A method for improving signal quality in an active HDMI cable as recited in claim 15, further comprising:
a. providing a non-volatile memory in said programmable equalizer; and
b. storing said optimum configuration for all of said programmable parameters in said non-volatile memory.

17. A method for improving signal quality in an active HDMI cable as recited in claim 11, wherein said programmable equalizer is contained within said sink connector.

18. A method for improving signal quality in an active HDMI cable as recited in claim 11, further comprising:
a. providing an external programmer;
b. using said measurement unit to sample said output signal emerging from each of said equalizers;
c. feeding said output signal information from said measurement unit to said external programmer;
d. using said external programmer to vary said programmable parameters in said microcontroller onboard active HDMI cable while said output signal information is monitored by said external programmer;
e. using said external programmer to determine an optimum configuration for all of said programmable parameters;
f. sending said optimum configuration from said external programmer to said active HDMI cable; and
g. setting said optimum configuration within said active HDMI cable.

19. A method for improving signal quality in art active HDMI cable as recited in claim 18, further comprising:
a. providing a non-volatile memory in said programmable equalizer; and
b. storing said optimum configuration for all of said programmable parameters in said non-volatile memory.

20. A method for improving signal quality in an active HDMI cable as recited in claim 19, further comprising storing, said optimum configuration as a binary coded decimal word.

* * * * *